United States Patent
Møller et al.

(10) Patent No.: US 6,443,232 B1
(45) Date of Patent: Sep. 3, 2002

(54) SHOCK-ABSORBING HORSESHOE AND A METHOD OF MANUFACTURING SUCH A HORSESHOE

(75) Inventors: Helge Møller, Charlottenlund; Anders Moesgaard, Klampenborg, both of (DK)

(73) Assignee: Triple International ApS, Klampenborg (DK)

(*) Notice: Subject to any disclaimer, the term of this patent is extended or adjusted under 35 U.S.C. 154(b) by 0 days.

(21) Appl. No.: 09/701,743
(22) PCT Filed: Jun. 4, 1999
(86) PCT No.: PCT/DK99/00296
§ 371 (c)(1),
(2), (4) Date: Dec. 4, 2000
(87) PCT Pub. No.: WO99/65298
PCT Pub. Date: Dec. 23, 1999

(30) Foreign Application Priority Data

Jun. 4, 1999 (DK) .......................... 1998 00760

(51) Int. Cl.[7] .................................................. A01L 7/02
(52) U.S. Cl. ................................................................ 168/12
(58) Field of Search ........................... 168/11, 12, 13, 168/16, 23; D30/146, 147

(56) References Cited

U.S. PATENT DOCUMENTS

| | | | |
|---|---|---|---|
| 649,231 A | * 5/1900 | Winquist | 168/12 |
| 2,103,718 A | 12/1937 | Goodwin | |
| 3,180,421 A | * 4/1965 | Hirshberg et al. | 168/12 |
| 3,200,885 A | * 8/1965 | Johnson | 168/12 |
| 4,765,412 A | * 8/1988 | Colonel | 168/11 |
| 5,560,428 A | 10/1996 | Inglin | |
| 5,988,288 A | * 11/1999 | Bourdieu | 168/12 |

FOREIGN PATENT DOCUMENTS

| | | |
|---|---|---|
| DE | 229090 | 11/1910 |
| DK | 19284 | 9/1914 |
| FI | 82176 | 5/1989 |
| WO | 92 17059 | 10/1992 |
| WO | 96 01044 | 1/1996 |

* cited by examiner

*Primary Examiner*—Charles T. Jordan
*Assistant Examiner*—Elizabeth Shaw
(74) *Attorney, Agent, or Firm*—Browdy and Neimark, P.L.L.C.

(57) ABSTRACT

In a shock-absorbing horseshoe (1) a resilient intermediate layer (4) is positioned in a sandwich arrangement between an upper part (2) and an under part (3) substantially in parallel therewith, the intermediate layer (4) filing out completely the interspace between the upper part (2) and the under part (3). In the under part (3) openings (7A) are provided, said openings allowing passage of nailheads of conventional horseshoe fastening nails (13) in such a manner that the securing of the horseshoe (1) to the hoof by means of such nails is accomplished solely through the abutment of the nailhead against the resilient intermediate layer (4) and through the resilient compression of said layer.

15 Claims, 2 Drawing Sheets

Figure 1:
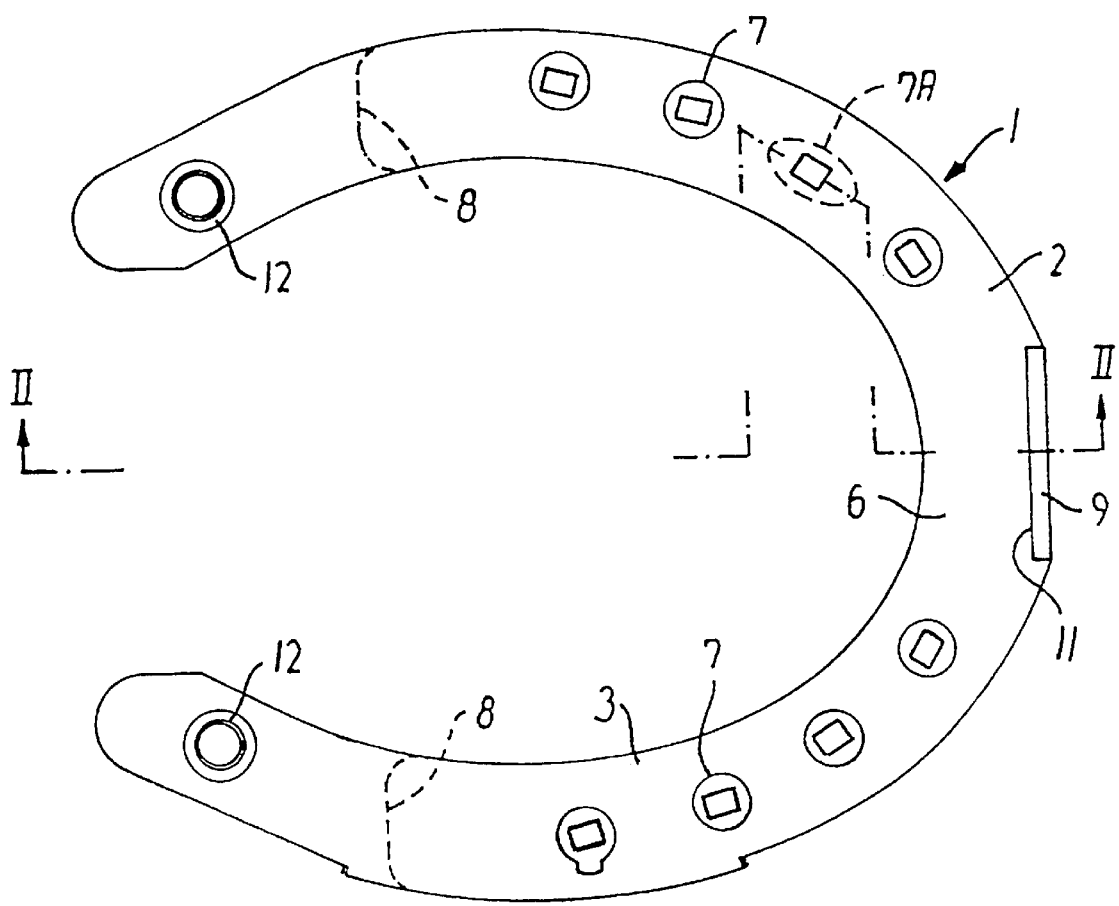

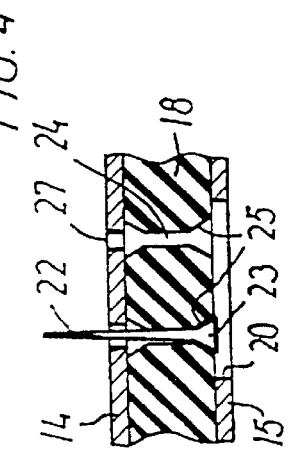
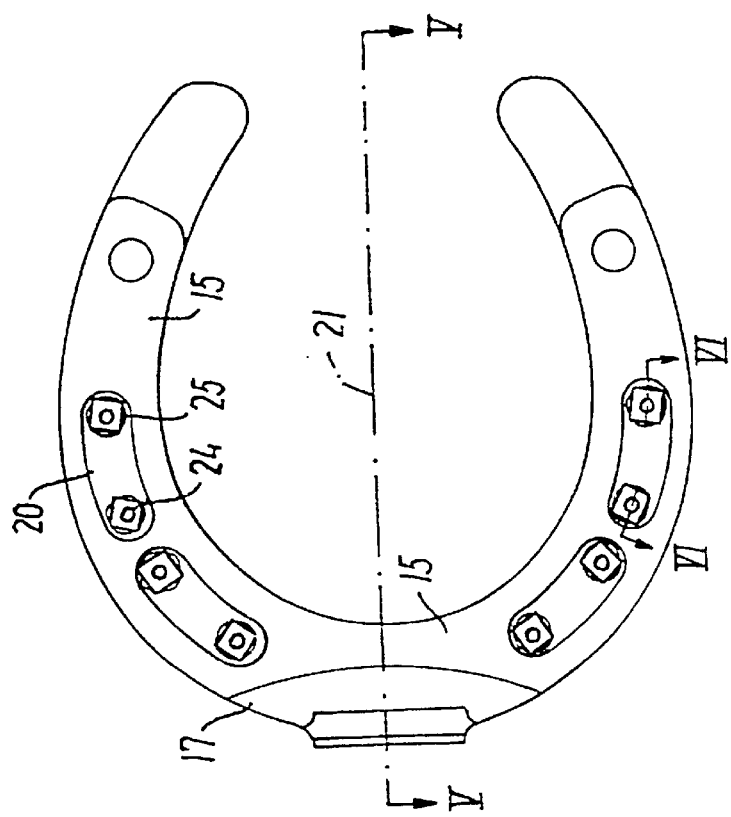
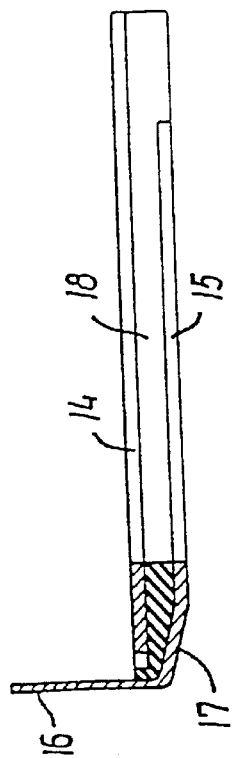
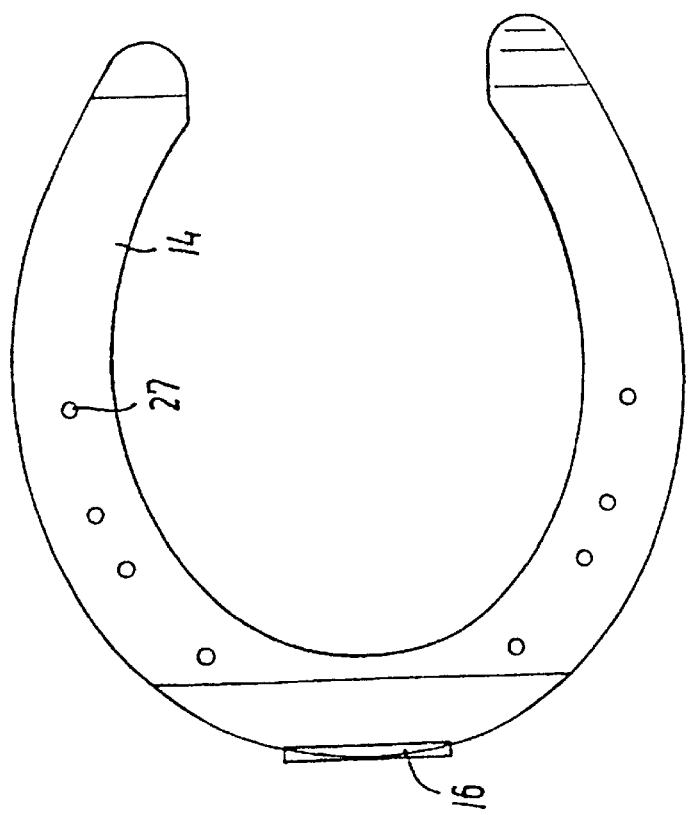

1

SHOCK-ABSORBING HORSESHOE AND A METHOD OF MANUFACTURING SUCH A HORSESHOE

The present application is the national stage under 35 U.S.C. 371 of PCT/DK99/00296, filed Jun. 4, 1999.

The present invention relates to a shock-absorbing horseshoe with a resilient intermediate layer positioned between a rigid upper part for abutment on the underside of the hoof of the horse and a rigid under part extending at least under a part of the upper part, the upper part and the under part being in rigid mechanical connection with each other solely at the front edge of the shoe.

In a horseshoe of this type known from DK-C-19284 the backwards facing branches of the upper part and the under part of the double horseshoe are substantially of equal length and are connected near their rear ends by means of bolts screwed into threaded bores in the under part and extending somewhat into the prebored holes in the upper part, the resilient intermediate layer being positioned as a resilient ring around each bolt between the under part and the upper part. In this design the shock-absorbing effect of the intermediate layer is considerably impaired by the bolt heads positioned under the bottom side of the under part.

Moreover, as this known horseshoe is secured to the hoof solely by nailing through side edge portions of the upper part outside the narrower under part, the shoeing is made difficult, and the missing intermediate layer in the major part of the interspace between the upper part and the under part requires high rigidity of these parts and a solid, mechanical connection, for instance by welding, between the upper and under parts at the front edge of the shoe, which further impairs the resiliency aimed at.

In an embodiment of a horseshoe known from WO 92/17059, attempts have been made to avoid these drawbacks by placing a shock-absorbing intermediate layer of silicone rubber in the entire interspace between an upper part and an under part consisting of two aluminium layers. The comparatively soft intermediate layer entails that for lack of other mechanical connection means between the upper part and the under part, such connection should be established by means of fastening nails. As aluminium per se is not a particularly well wearing material, there is a considerable risk that the desired shock-absorbing effect will decrease in a short time or be completely eliminated when the nailheads touch the substratum.

In view of this prior art, the object of the invention is to provide a horseshoe of the type stated, which has a simple construction enabling manufacture at a competitive price and gives a substantially improved dampening at impact of the horse hoof against the substratum, and at the same time a particular stable connection with the substratum at the take-off of the hoof is attained as well as a safe securing of the shoe to the hoof without any risk that the individual parts of the shoe will fall apart during use, which may lead to severe damages to the horse.

To meet this object, the shock-absorbing horseshoe is according to the invention characterized in that the under part extends substantially in parallel with the upper part, that the resilient material completely fills out the interspace between the upper part and the under part and is secured thereto, and that openings are provided in the under part, said openings allowing passage of a nailhead of a per se conventional fastening nail in such a manner that the securing of the horseshoe to the hoof by means of such nails is accomplished solely by the abutment of the nailhead on the resilient intermediate layer and by the resilient compression of said layer.

Simultaneously with the fact that the rigid mechanical connection known per se between the upper part and the under part at the front edge ensures a good connection from the hoof through the shoe and down to the substratum at take-off, the fact that the resilient layer fills out completely the interspace between the upper part and the under part entails an optimal shock-absorbing effect in such a manner that the upper part and the under part, in particular at the backwards facing branches of the shoe parts, may spring against and away from each other by the resilient deformation of the intermediate layer.

As the impact of the hoof against the substratum starts at the rear edges of the shoe, the need for shock-absorption is greatest in these places. By the invention a good shock-absorbing effect is ensured at the rear edge of the hoof, where the two metal parts may move fairly freely against one another without being hindered by the rigid mechanical connection at the front edge.

Whereas it has been a problem in connection with the nailing of conventional embodiments of shock-absorbing horseshoes that the fastening nails by the natural compression of the shock-absorbing intermediate layer at each step will become too long which may entail a risk that impurities may penetrate between the hoof and the upper side of the shoe and that the nails may work themselves out of the hoof, the invention has the effect that at the nailing a certain spring-compression of the intermediate layer takes place, whereby the shoe is brought into spring-tensional abutment on the under side of the hoof, and the risk that impurities may penetrate between the hoof and the shoe or that the nails will work themselves out of the hoof is eliminated, the safe securing of the shoe to the hoof being simultaneously ensured under all conditions, also in case of horses with weak hooves.

The upper part and the under part may be made from any suitable material having the required rigidity and wearability, but typically a metal with good wearability and good working properties like for instance steel is chosen.

The shock-absorbing material in the intermediate layer may be resilient plastics and rubbers which have good working properties and which by moulding may be brought to adhere well to the surface of the upper and under parts. Polyurethane (PU) has in particular turned out to be a suitable material.

Advantageous embodiments of the shock-absorbing horseshoe according to the invention are stated in the dependent claims.

In a method preferred for the manufacture of the horseshoe according to the invention the upper part and the under part are cut or punched from sheet material, preferably steel sheet, following which the intermediate layer is manufactured by embedding shock-absorbing, resilient material directly into the interspace between the upper part and the under part.

Figure 2:
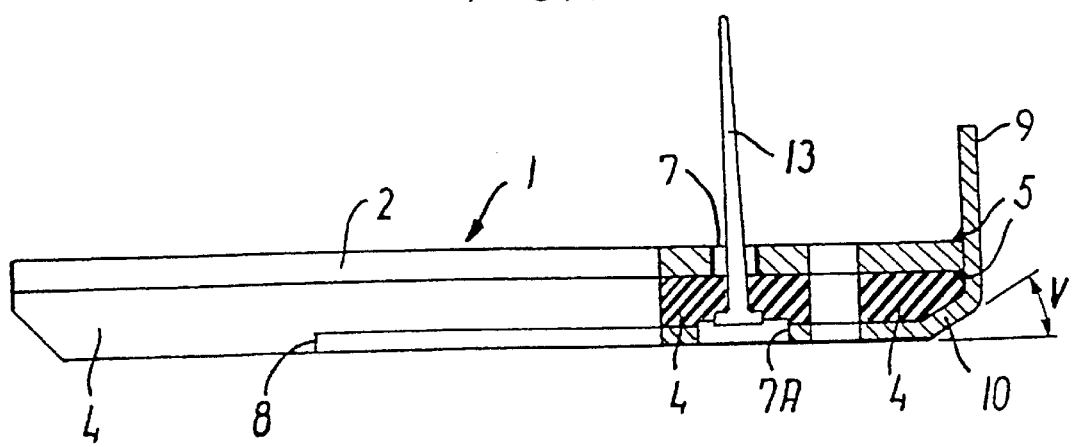

The invention will now be explained in detail in the following with reference to the schematic drawing, in which FIG. 1 is a plan view of a comparatively simple embodiment of a shock-absorbing horseshoe according to the invention, seen from the upper side, FIG. 2 is a sectional view along the line II—II in FIG. 1, FIGS. 3 and 4 are plan views of an upper part and an under part in a preferred embodiment, and FIGS. 5 and 6 are sectional views along the lines V—V and VI—VI, respectively, in FIGS. 3 and 4.

The horseshoe 1 in Figures is shaped in the usual manner according to the hoof of the horse with a front portion coherent with two backwards facing branches. In the shoe 1, nail holes 7, 7A are provided such that the shoe may be nailed to the underside of the hoof of the horse by means of usual horseshoe nails 13.

As will appear from FIG. 2 the shoe comprises a rigid upper part 2 for abutment on the underside of the hoof of the horse, a rigid under part 3 for contacting the substratum and an intermediate layer 4 of shock-absorbing resilient material between the upper and the under parts 2 and 3. By the term "rigid" is to be understood a material property in the form of a high E-module relative to the shock-absorbing material in the intermediate layer 4 which typically has a comparatively low E-module.

The upper and under parts 2 and 3 may be made from plane steel sheets, and the under part 3 is at the front portion 6 of the shoe provided with a toe clip 9 serving as abutment for the front edge of the hoof and having the shape of an extension coherent with the under part 3, said extension being bent upwards from the under part 3. At the front portion 6 an area 10 of the under part is furthermore bent upwards under an angle v with the underside of the under part 3, said angle being in the embodiment shown 20°, for the provision of a take-off roller surface for the horseshoe.

In the embodiment shown, a recess 11 is provided in the upper part 2 at the front portion 6, in which the upwards bent toe clip 9 is received. In this manner a rigid mechanical connection may be provided between the upper part 2 and the under part 3 by welds 5 in the transverse direction of the shoe in the recess 11.

However, the toe clip 9 does not necessarily have to be designed as an extension of the under part 3, but may alternatively be integral with the upper part, for instance if it is desired to manufacture the under part with bigger thickness of material for reasons of strength and wear, or it may be manufactured as a separate member, which for instance by welding is connected with either the upper part 2 or the under part 3.

The transverse welding 5 at the front edge of she front portion 6 has owing to the resilience of the steel a hinge function such that the upper part 2 and the under part 3 at the backwards facing branches of the shoe comparatively easily may be moved towards each other or away from each other under elastic deformation of the intermediate layer 4. At the front portion 6, the welding 5 will on the other hand provide a rigid mechanical connection between the upper part 2 and the under part 3.

The shock-absorbing intermediate layer 4 fills out the entire intermediate space between the substantially parallel upper and under parts 2 and 3.

As shown in FIG. 2 the backwards facing branches of the under part 3 may be somewhat shorter than the backwards facing branches of the upper part 2, such that the rear edges of the under part 3 are positioned somewhat ahead of the rear edges of the upper part 2. By extending the intermediate layer 4 to the rear edges of the backwards facing branches of the upper part 2, an optimal shock-absorbing effect with a particularly gentle touch is obtained in the rear part of the horseshoe which is the part of the shoe first hitting the substratum.

In the backwards facing branches of the shoe threaded holes 12 may be provided in the upper part 2 for the screwing in of modax to enable the horse to stand firm on a slippery or loose substratum such as ice or snow or in connection with riding in rough terrain. Likewise, not shown holes may be prepared at or on the oblique take-off roller surface 10 for receiving special-purpose hardened pins in view or increasing wearability and thereby providing the possibility of use of the shoe on a hard substratum like asphalt.

The nail holes 7 and 7A are provided in the upper part 2 and in the under part 3, respectively, but are in the under part 3, as shown in respect of a single one of the nail holes, made with a size allowing the nailheads to pass for abutment on and local resilient compression of the shock-absorbing intermediate layer 4. At the nailing of the shoe in the hoof of a horse, a nail 13 will, when driven in, resiliently compress the shock-absorbing layer 4. When the shoe is subsequently subjected to weight, it will be possible for the under part 3 to be pressed against the upper part 2 without influencing the securing of the upper part to the hoof.

When the nails 13 are driven in, it may occur that a nail is positioned slightly askew or gets an angle which is not quite correct, and the nail then has to be removed and driven in once more. With a view to making this possible, the nail holes 7A in the under part 3 are in the embodiment shown designed in such a manner that it is possible with a tool to extract a nail again from the underside of the shoe. The nail hole 7A may, as shown in FIG. 1, for instance be oval, whereby space is provided to enable a tool to clamp the nailhead from two sides. In consideration of space and strength an oval nail hole is provided lengthwise in the longitudinal direction of the shoe.

In the embodiment of FIGS. 3–6, the upper part 14 and the under part 15 are by and large designed in the same way as shown in FIGS. 1 and 2 with the following divergences.

No rigid connection corresponding to the welding shown in FIG. 5 has been provided between the upper part 14 and the toe clip bent up from the front edge of the under part 15, the bending up of the take-off roller surface 17 from the under part 15 in combination with the safe securing obtained by the moulding of the intermediate layer of the shock-absorbent, resilient material in the intermediate layer 18 having per se turned out to impart a fully satisfactory rigidity of the mechanical connection between the upper part 14 and the under part 15.

Moreover, the area of the take-off roller surface 17 is increased somewhat relative to the embodiment in FIGS. 1 and 2 through a smaller bending angle, the resulting angle between the surface 17 and the underside of the under part 3 being approx. 15°.

Instead of the separate nail holes 7A shown in FIGS. 1 and 2, openings have been provided in the under part 3 in the form of mortises 20, which, as shown, may be positioned symmetrically about the symmetry axis 21 of the horseshoe and which each leaves room for the driving in of two fastening nails 22. The mortises 20 have, as shown, preferably a curved shape following the curvature of the horseshoe.

To provide a safe abutment surface for the under-side of the nail head 23 of each fastening nail 22 a countersinking 25 has been provided in the side of the intermediate layer 18 facing the under part 15 for each of the two nail holes 24 provided in the under part 3 opposite each mortise 20 as shown in FIG. 6.

To fit conventional horseshoe nails, in which the nailhead has the shape of a reverse frustum of a pyramid, the countersinkings have likewise, as will be seen from FIGS. 4 and 6, the shape of a frustum of a pyramid.

To eliminate to a high extent the need for extraction of fastening nails as described above, the countersinkings 25 shaped as the frustum of a pyramid in the underside of the intermediate layer 18 may advantageously be made with a slightly bigger apex angle, i.e. somewhat flatter than the frustum-of-a-pyramid-shape of the nailhead 23, such that at the driving in the possibility of a certain oblique positioning or angling of the fastening nail 22 is obtained, and in this connection a countersinking 26, which is conical or has the shape of a frustum of a pyramid may also be provided at the mouth of the nail hole 24 in the upperside of the intermediate layer facing the upper part 14 and the nail hole 27 provided therein, said countersinking having preferably a smaller top angle than the nailhead.

By this embodiment a considerably improved possibility is obtained of a correct positioning of each fastening nail during the driving in, such that the nail is introduced in an area of the hoof where no bending of the nail will take place.

By the manufacture of the horseshoe according to the invention the upper part 2, 14, respectively, and the under part 3, 15, respectively, are first punched or cut from sheet material, preferably steel sheet, either as two separate parts or one coherent part.

By separate punching of the parts 2, 14 and 3, 15 in the embodiments shown in FIGS. 1 and 2, a bending up is then carried out of the take-off roller surface 10, 17 and the toe clip 9, 16 from the under part 3, 15. If in this connection, as shown in FIGS. 1 and 2, a rigid connection is desired between the upper part 2 and the under part 3, said connection is made subsequently, preferably by a welding operation.

The intermediate layer 4, 18 is then made by embedding the shock-absorbing resilient material, preferably polyurethane, directly in the interspace between the upper part 2, 14 and the under part 3, 15. By this moulding operation, the parts 2,3 and 14, 15, respectively, are placed in a mould having room for simultaneous moulding of the extensions of the intermediate layer 4, 18 beyond the rear edges of the backwards facing branches of the under part 3, 15. In the nail holes 7, 7A, in FIGS. 1–2, and 20, 27, in FIGS. 3–6, respectively, provided in the upper part 2, 14 and the under part 3, is, and for providing nail holes, if any, with associated countersinkings in the intermediate layer 4, 18, suitable core elements are used during the moulding.

What is claimed is:

1. A shock-absorbing horseshoe (1) with a resilient intermediate layer (4, 18) positioned between a rigid upper part (2,14) for abutment on the underside of the hoof of the horse and a rigid under part (3,15) extending at least under a part of the upper part (2, 14), the upper part (2, 14) and the under part (3, 15) being in rigid mechanical connection with each other solely at the front edge of the shoe, characterized in that the under part (3, 15) extends substantially in parallel with the upper part (2, 14) that the resilient material completely fills out the interspace between the upper part (2, 14) and the under part (3,15) and is secured thereto, and that openings (7A, 20) are provided in the under part (3, 15), said openings allowing passage of a nailhead (23) of a per se conventional fastening nail (13, 22) in such a manner that the securing of the horseshoe to the hoof by means of such nails is accomplished solely by the abutment of the nailhead against the resilient intermediate layer (4, 18) and by the resilient compression of said layer.

2. A horseshoe according to claim 1, characterized in that the intermediate layer (4, 18) consists of a moulded resilient plastic material, preferably polyurethane.

3. A horseshoe according to claim 2, characterized in that said openings (20) in the 35 under part are designed as and have a design which follows the curvature of the shoe.

4. A horseshoe according to claim 3 characterized in that in the side of the intermediate layer (18) facing the under part (15) and opposite said openings (20) in the under part (15), countersinking (25) for nailheads (23) in connection with through nail holes (24) are provided.

5. A horseshoe according to claim 4, characterized in that the upper part (2, 14) and the under part (3, 15) have been manufactured by cutting or punching from a sheet material.

6. A horseshoe according to claim 1, characterized in that said openings (20) in the under part are designed as mortises and have a design which follows the curvature of the shoe.

7. A horseshoe according to claim 1, characterized in that in the side of the intermediate layer (18) facing the under part (15) and opposite said openings (20) in the under part (15), countersinkings (25) for nailheads (23) in connection with through nail holes (24) are provided.

8. A horseshoe according to claim 8, to be secured by means of nails (22) with nailheads (23) with an abutment surface of substantially the shape of a frustum of a pyramid, characterized in that said countersinkings (23) have the shape of a frustum of a pyramid.

9. A horseshoe according to claim 8, characterized in that said countersinkings (25) have a bigger apex angle than the nailheads (23), and that the through-going nail holes (24) of the intermediate layer (18) on the top side intended for abutment on the hoof have been enlarged to a conical countersinking (26) or a countersinking of a shape like a frustum of a pyramid.

10. A horseshoe according to claim 1, characterized in that the upper part (2, 14) and the under part (3, 15) have been manufactured by cutting or punching from a sheet material, and that the backward facing branches of the under part (3, 15) are shorter than the backward facing branches of the upper part (2, 14), the resilient intermediate layer (4, 18) extending beyond the rear edges (8) of the under part and ending at the rear edges of the upper part and the underside of the parts protruding behind the branches of the under part (3, 15) extending substantially in alignment with the underside of the under part (3, 15).

11. A horseshoe according to claim 10, characterized in that a toe clip (9, 16) serving as abutment surface for the front edge of the hoof is integral with the under part (3, 15) in extension of its front edge and bent up therefrom to protrude beyond the upper part (2, 14).

12. A horseshoe according to claim 11, characterized in that said toe clip (9) is rigidly connected with the upper part (2), preferably by welding.

13. A method for the manufacture of a horseshoe according to claim 11, characterized in that the upper part (2, 14) and the under part (3, 15) are cut or punched from sheet material, preferably steel sheet, and that the intermediate layer (4, 18) is subsequently manufactured by embedding shock-absorbing, resilient material directly into the interspace between the upper part (2, 14) and the under part (3, 15).

14. A method according to claim 13, for the manufacture of a horseshoe characterized in that the upper part (2, 14) and the under part (3, 15) are cut or punched separately with a toe clip-forming extension integral with the under part (3, 15) at its front edge, said extension being prior to said embedding and together with a front portion of the under part bent for the formation of a take-off roller surface (10, 17) oblique relative to the under part (3, 15) and a toe clip protruding beyond the upper part (2, 14), whereby the bent up toe clip (9) is brought into fixed connection with the front edge of the upper part (2), preferably by welding (5).

15. A horseshoe according to claim 10, characterized in that an area of the front portion of the under part (3, 15) is bent upwards behind its front edge under an angle with the underside of the under part (3, 15) of 10–20° for providing a take-off roller surface (10, 17).

* * * * *